US012771764B2

(12) United States Patent
Wu et al.

(10) Patent No.: US 12,771,764 B2
(45) Date of Patent: Oct. 20, 2026

(54) WIRELESS COMMUNICATION METHOD AND WIRELESS COMMUNICATION DEVICE FOR SPATIAL REUSE

(71) Applicant: MEDIATEK Inc., Hsinchu City (TW)

(72) Inventors: Tsung-Hsuan Wu, Hsinchu City (TW); Po-Chun Fang, Hsinchu City (TW); Hsiao-Kai Liao, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 11 days.

(21) Appl. No.: 18/743,385

(22) Filed: Jun. 14, 2024

(65) Prior Publication Data

US 2025/0023961 A1 Jan. 16, 2025

Related U.S. Application Data

(60) Provisional application No. 63/512,669, filed on Jul. 10, 2023.

(51) Int. Cl.

*H04L 69/22* (2022.01)
*H04W 16/14* (2009.01)
*H04W 84/12* (2009.01)

(52) U.S. Cl.

CPC ............ *H04L 69/22* (2013.01); *H04W 16/14* (2013.01); *H04W 84/12* (2013.01)

(58) Field of Classification Search

CPC ........ H04L 69/22; H04W 16/14; H04W 84/12
USPC ........................................................ 370/338
See application file for complete search history.

(56) References Cited

U.S. PATENT DOCUMENTS

| | | | | |
|---|---|---|---|---|
| 2014/0071874 | A1* | 3/2014 | Li | H04L 1/1887 370/311 |
| 2017/0295588 | A1* | 10/2017 | Ahn | H04W 52/0225 |
| 2018/0270038 | A1 | 9/2018 | Oteri | |
| 2018/0302255 | A1* | 10/2018 | Verma | H04L 1/004 |
| 2020/0045637 | A1 | 2/2020 | Noh | |
| 2020/0280877 | A1* | 9/2020 | Morioka | H04W 28/06 |
| 2020/0314891 | A1* | 10/2020 | Li | H04W 74/006 |
| 2020/0374870 | A1* | 11/2020 | Guo | H04W 72/12 |
| 2021/0328741 | A1* | 10/2021 | Jang | H04L 27/2666 |
| 2024/0305995 | A1* | 9/2024 | Kim | H04W 16/02 |

FOREIGN PATENT DOCUMENTS

| | | | | |
|---|---|---|---|---|
| WO | WO-2021034628 A1 * | 2/2021 | | H04B 7/0695 |
| WO | 2022051408 A1 | 3/2022 | | |

OTHER PUBLICATIONS

TW Office Action dated Feb. 27, 2025 in Taiwan application No. 113125647.

* cited by examiner

*Primary Examiner* — Jae Y Lee
*Assistant Examiner* — Haeshil Jessica Choi
(74) *Attorney, Agent, or Firm* — McClure, Qualey & Rodack, LLP

(57) ABSTRACT

The application provides a wireless communication method and device for spatial reuse. A heading information of a current-received data packet is decoded by a spatial reuse (SR) initiator device. Based on a decoding result, the SR initiator device determines to initiate SR. The SR initiator device drops the current-received data packet. The SR initiator device transmits a dummy leading signal to a SR response device. The SR initiator device transmits a spatial reuse data packet to the SR response device.

18 Claims, 4 Drawing Sheets

WIRELESS COMMUNICATION METHOD AND WIRELESS COMMUNICATION DEVICE FOR SPATIAL REUSE

CROSS-REFERENCE TO RELATED ART

This application claims the benefit of U.S. provisional patent application Ser. No. 63/512,669, filed Jul. 10, 2023, the disclosure of which is incorporated by reference herein in its entirety.

TECHNICAL FIELD

The present invention relates to a wireless communication method and a wireless communication device for spatial reuse.

BACKGROUND

Over the past few years, the proliferation of mobile devices has ignited a surge of interest in wireless LAN (Local Area Network) technology, designed to deliver rapid wireless Internet services to these devices. This technology enables devices like smart phones, smart pads, laptop computers, portable multimedia players, embedded apparatus, and the like to access the Internet wirelessly within homes, businesses, and designated service areas, using short-range wireless communication.

Institute of Electrical and Electronics Engineers (IEEE) 802.11, has been at the forefront of developing and commercializing various technological standards to support wireless LANs. The initial IEEE 802.11 standard operated in the crowded 2.4 GHz frequency range and offered a maximum communication speed of 11 Mbps. Subsequently, IEEE 802.11b improved upon this with the same frequency range but a maximum speed of 11 Mbps. In contrast, IEEE 802.11a, commercialized later, utilized the less congested 5 GHz band, enhancing communication speeds to a maximum of 54 Mbps through Orthogonal Frequency Division Multiplexing (OFDM) technology. However, it suffered from a shorter communication range compared to IEEE 802.11b. IEEE 802.11g, on the other hand, maintained compatibility with the 2.4 GHz band while achieving speeds of up to 54 Mbps, making it a popular choice for its compatibility and improved range compared to IEEE 802.11a.

To address the limitations of wireless LAN speed, IEEE 802.11n emerged as a standard designed to boost network speed and reliability while extending the operating range. IEEE 802.11n supports High Throughput (HT) with data processing speeds exceeding 540 Mbps, employing Multiple Inputs and Multiple Outputs (MIMO) technology. This involves multiple antennas on both transmitting and receiving units to minimize transmission errors and optimize data speed. Additionally, the standard allows for the use of coding schemes that transmit overlapping copies of data to enhance reliability.

As the demand for wireless LAN systems supporting even higher throughputs than those provided by IEEE 802.11n increased and applications diversified, the spotlight turned to IEEE 802.11ac. This standard supports wider bandwidths (ranging from 80 to 160 MHZ) in the 5 GHz frequency range. While IEEE 802.11ac primarily operates in the 5 GHz band, initial 11*ac* chipsets maintained compatibility with the 2.4 GHz band to support existing products. Theoretically, this standard can achieve wireless LAN speeds of at least 1 Gbps for multiple stations and a minimum single-link speed of 500 Mbps. It accomplishes this by expanding on concepts from IEEE 802.11n, including a wider wireless frequency bandwidth (up to 160 MHZ), more MIMO spatial streams (up to 8), multi-user MIMO, and high-density modulation (up to 256 QAM). Additionally, IEEE 802.11ad introduced a scheme utilizing the 60 GHz band, achieving speeds of up to 7 Gbps with beamforming technology, catering to high-bit-rate media streaming, such as large data files and non-compressed HD video. However, it is limited by its short-distance coverage due to difficulties in penetrating obstacles.

Meanwhile, ongoing discussions are focused on developing next-generation wireless LAN standards beyond IEEE 802.11ac and 802.11ad, particularly emphasizing high-efficiency and high-performance communication in dense environments. These environments require communication with high-frequency efficiency, whether indoors or outdoors, and are characterized by the presence of numerous stations and access points (APs). Various technologies are being explored to meet these communication challenges effectively.

Contrary to its predecessors, Wi-Fi 6 prioritizes enhancing spectral efficiency over merely increasing throughput. A pivotal component of Wi-Fi 6 that contributes significantly to this improved efficiency is Spatial Reuse (SR). This article provides an overview of the fundamental components and the operational mechanism of SR.

FIG. 1 shows Overlapping Basic Service Set (OBSS). As shown in FIG. 1, BSS 1 and BSS 2 are operating on the same channel and are capable of detecting each other with a Received Signal Strength Indicator (RSSI) higher than the Clear Channel Assessment (CCA) Signal Detection (SD) threshold. In the world of Wi-Fi, this CCA threshold serves as a critical determinant for devices when deciding whether the channel is clear for transmission or if they should wait and back off. When a co-channel Basic Service Set (BSS) can be heard with an RSSI surpassing the CCA threshold, it's referred to as an overlapping BSS (OBSS). In simpler terms, BSS 2 is considered an OBSS for BSS 1, and vice versa. In FIGS. 1, AP1 and AP2 refer to access points while STA1-STA3 refer to clients (for example but not limited by, a Wi-Fi smart phone).

In previous Wi-Fi iterations, the CCA threshold was fixed, meaning that if an ongoing Wi-Fi transmission was detected with a higher RSSI, all other potential transmitters had no choice but to step back and wait their turn. Wi-Fi 6, with its primary focus on optimizing spectrum usage, introduces a more adaptable approach to spatial channel reuse. With Wi-Fi 6, a device, be it an Access Point (AP) or a client, seeking to transmit on an already busy channel can dynamically adjust its CCA thresholds. However, raising the CCA threshold, while necessary to prevent interference, also requires the device to reduce its own transmit power if it intends to transmit concurrently. This is where Spatial Reuse (SR) comes into play. Due to SR, a Wi-Fi 6 device can transmit simultaneously with an ongoing OBSS transmission, as long as the SR transmission operates at an adequately low transmit power. For instance, in FIG. 1, the access point AP2 can transmit to the client STA2 concurrently with an ongoing transmission between the access point AP1 and the client STA1. This way, SR maintains the politeness of Carrier Sense Multiple Access with Collision Avoidance (CSMA/CA) while harnessing transmission opportunities that earlier Wi-Fi versions missed out on.

It's important to note that SR transmissions occur alongside the regular CSMA/CA transmissions. CSMA/CA-based transmissions continue to be the backbone of Wi-Fi, while SR transmissions enhance spectral efficiency by creating more possibilities for parallel co-channel transmissions.

Two essential constraints govern SR transmissions: an SR transmission must not exceed the duration of the OBSS transmission, and the transmit (Tx) power used for SR transmission must be sufficiently low to prevent interference with the OBSS transmission.

From the perspective of a device, a transmission originating within its own BSS is termed an "intra-BSS" transmission, whereas a transmission from an OBSS is referred to as an "inter-BSS" transmission.

In the context of Spatial Reuse (SR) within Wi-Fi 6, it is crucial for a Wi-Fi device to distinguish between transmissions occurring within its own Basic Service Set (BSS) and those from neighboring BSS, known as inter-BSS transmissions. To facilitate this distinction, Wi-Fi 6 introduces the concept of "BSS color." This is an integer value ranging from 1 to 63 that serves as an identifier for a specific BSS. Within an 802.11ax High Efficiency (HE) frame, this BSS color value is embedded, enabling a Wi-Fi device to discern whether the transmitting BSS belongs to its own network or is part of an overlapping BSS (OBSS).

The BSS color information is strategically placed within the HE Physical Protocol Data Unit (PPDU). This placement ensures early detection of OBSS transmissions. Due to the rapid decoding capabilities of a Wi-Fi 6 device, a Wi-Fi 6 device can promptly identify an OBSS transmission. This swift recognition allows the device to make informed decisions and transmit in parallel without delay, thereby optimizing spatial channel reuse for improved efficiency in Wi-Fi 6 networks.

However, in prior art SR, when a Wi-Fi device decodes BSS color information in the PHY header of the current-received data packet and determines that the current-received data packet (i.e. the transmitting BSS) does not belong to its own network (i.e. the Wi-Fi device determines that the current-received data packet is part of an OBSS), the Wi-Fi device may decide to initiate SR, wherein the Wi-Fi device which decides to initiate SR operations is called SR initiator device. The SR initiator device drops the current-received data packet and switches from a receiver function into a transmitter function. After the transmitter function of the SR initiator device is active (while the receiver of the SR initiator device becomes into idle), the SR initiator device transmits data packet to a SR response device which receives the data packet sent from the SR initiator device.

However, the SR response device may have failure on decoding the data packet sent from the SR initiator device when the PHY header information of the data packet is too short. If the PHY header information of the data packet is too short, the synchronization between the SR initiator device and the SR response device is not performed well, which results in decoding failure.

In order to solve this problem, in prior art, the SR response device reduces modulation rate or data rate. However, reducing modulation rate or data rate is undesirable to wireless communication.

SUMMARY

According to one embodiment, a wireless communication method is provided. The wireless communication method includes: decoding a heading information of a current-received data packet by a spatial reuse (SR) initiator device; based on a decoding result, determining to initiate SR by the SR initiator device; dropping the current-received data packet by the SR initiator device; transmitting a dummy leading signal by the SR initiator device to a SR response device; and transmitting a spatial reuse data packet from the SR initiator device to the SR response device.

According to another embodiment, a wireless communication device is provided. The wireless communication device includes: a communication unit; and a processor coupled to the communication unit. The processor is configured for: decoding a heading information of a current-received data packet; based on a decoding result, determining to initiate spatial reuse (SR); dropping the current-received data packet; transmitting a dummy leading signal to a SR response device; and transmitting a spatial reuse data packet to the SR response device.

Figure 1:
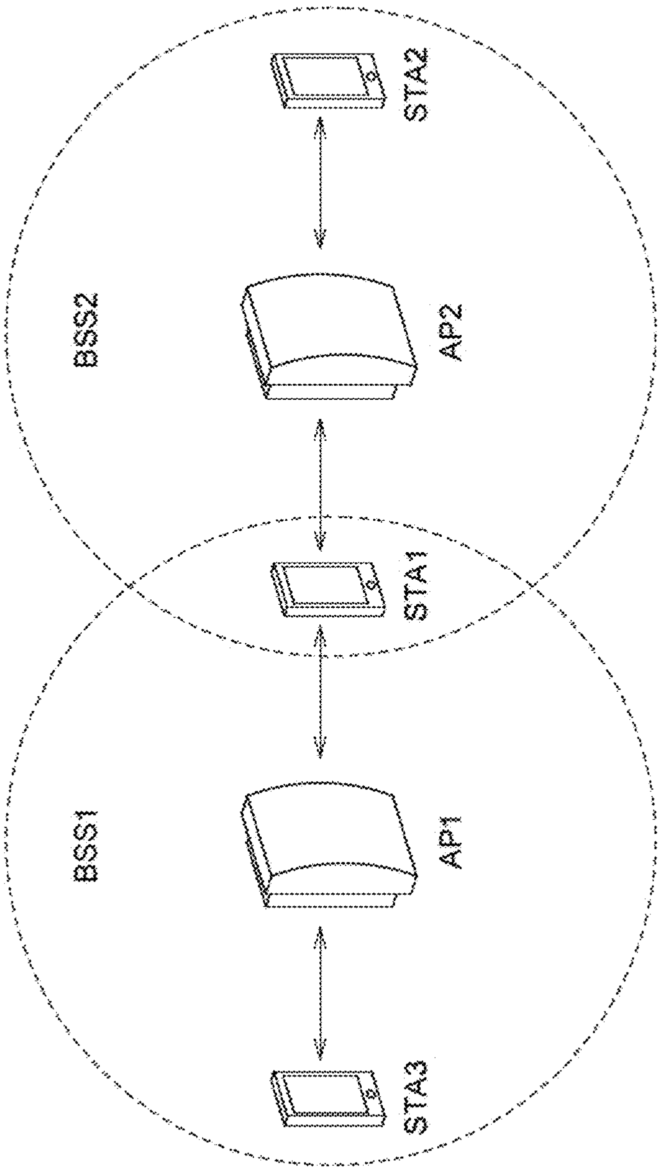
FIG. 1 (Prior art)
FIG. 1 shows Overlapping Basic Service Set (OBSS).

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Figure 2:
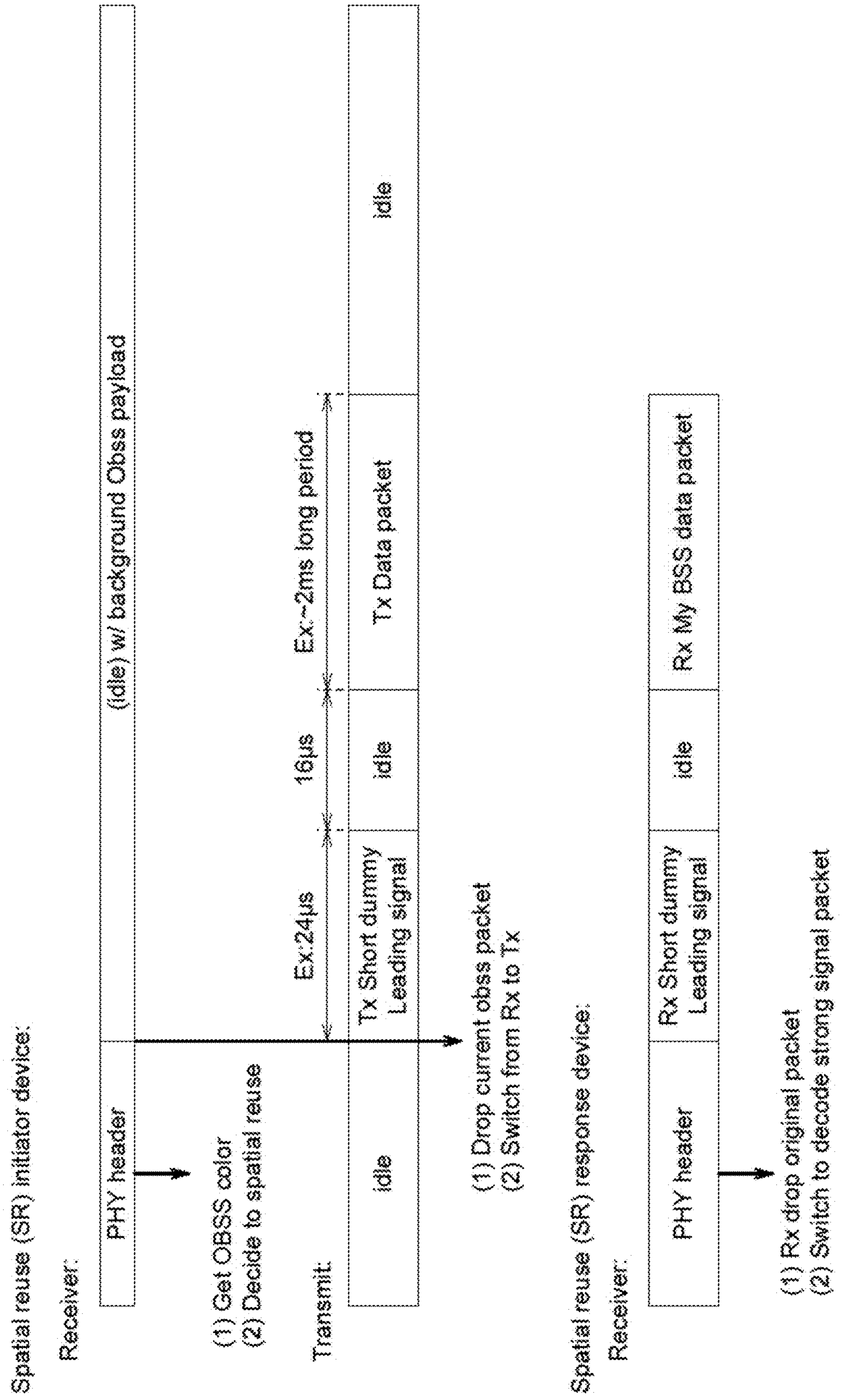
FIG. 2 shows a wireless communication method according to one embodiment of the application.

FIG. 2 shows a wireless communication method according to one embodiment of the application. As shown in FIG. 2, a spatial reuse (SR) initiator device and a SR response device may be for example but not limited by, either Access Point (AP) or a client (for example but not limited by, a Wi-Fi smart phone) or a station.

In FIG. 2, as for the SR initiator device, the receiver of the SR initiator device receives a data packet and decodes the OBSS color information contained in the PHY header (i.e. heading information). When the SR initiator device decodes that the BSS color information indicating the current-received data packet (i.e. the transmitting BSS) does not belong to its own network (i.e. the current-received data packet is part of an OBSS), the SR initiator device decides to initiate SR, wherein the Wi-Fi device which decides to initiate SR operations are called SR initiator device. The SR initiator device drops the current-received data packet and switches from a receiver function into a transmitter function.

After the transmitter of the SR initiator device is active (while the receiver of the SR initiator device becomes into idle), the transmitter of the SR initiator device transmits a short dummy leading signal to a SR response device. For example but not limited by, the short dummy leading signal may be all 1's (i.e. all bits of the short dummy leading signal are logic 1) or all 0's (i.e. all bits of the short dummy leading signal are logic 0) and have a duration of 24 μs. The SR response device drops the current-receiving data packet and switches to decode the short dummy leading signal which is a strong signal. Because the short dummy leading signal is short, the SR response device may decode failure. In one embodiment of the application, decoding failure of the short dummy leading signal does not matter because the short dummy leading signal just contains dummy information. After receiving the short dummy leading signal, the receiver of the SR response device returns into the idle state. Further, in one embodiment of the application, the SR response device does not need to response ACK (acknowledge) signal to the SR initiator device when the SR response device receives and decodes the short dummy leading signal.

Then, the transmitter of the SR initiator device becomes into idle for another short period (a reference idle period), for example but not limited by, 16 μs.

Then, the transmitter of the SR initiator device transmits spatial reuse data packet (for example but not limited by, having ~2 ms long period) to the SR response device. When the receiver of the SR response device receives the data packet (which is also called as "my BSS data packet"), due to without a packet drop behavior, the SR response device can fully use the PHY header of the data packet to synchronize. Thus, in one embodiment of the application, the SR response device is easier to have successful decoding of the data packet, even if without reduction of modulation rate or data rate.

That is, in one embodiment of the application, in spatial reuse situation, both the SR response device and the SR initiator device may transmit/receive the data packet in high modulation rate or high data rate. Thus, the prior problem (reducing modulation rate or data rate due to synchronization failure) is solved in one embodiment of the application.

Figure 3:
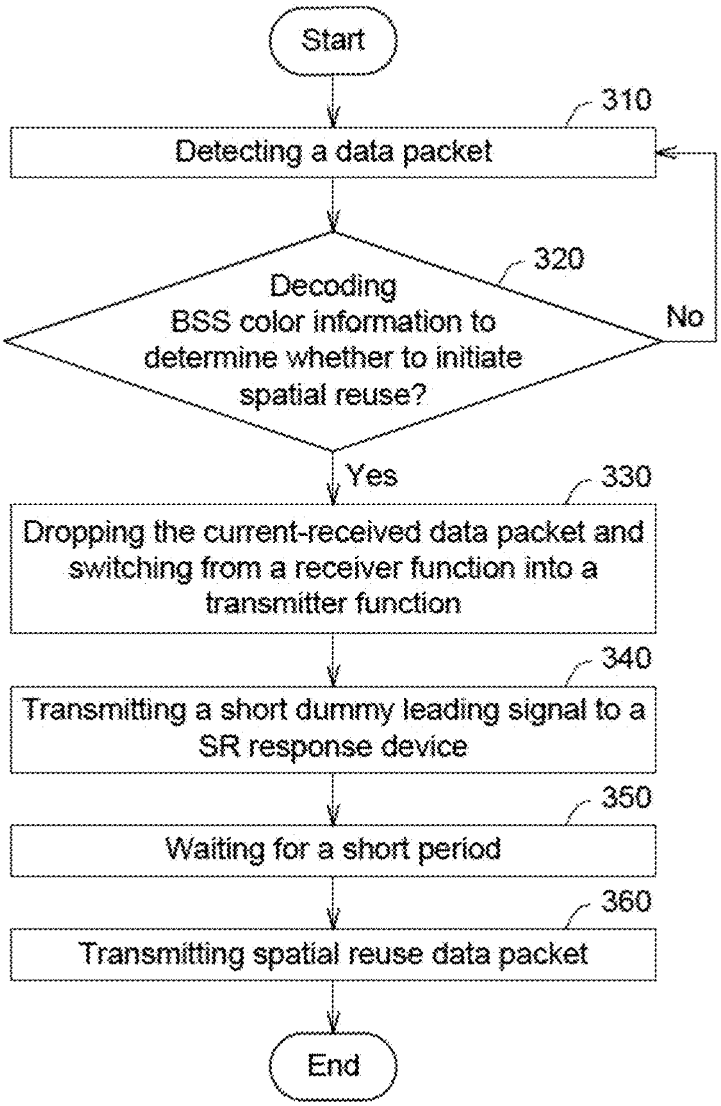
FIG. 3 shows a wireless communication method according to one embodiment of the application.

FIG. 3 shows a wireless communication method according to one embodiment of the application. In step 310, the receiver of the SR initiator device detects a data packet.

In step 320, the SR initiator device decodes BSS color information in the PHY header of the current-received data packet to determine whether to initiate SR. In determining whether to initiate SR, the SR initiator device determines whether the BSS color information indicates that the current-received data packet (i.e. the transmitting BSS) belongs to its own network (i.e. whether BSS color information indicates that the current-received data packet is part of an OBSS). When the SR initiator device determines that the current-received data packet (i.e. the transmitting BSS) does not belong to its own network (i.e. the SR initiator device determines that the current-received data packet is part of an OBSS), the SR initiator device decides to initiate SR.

In step 330, the SR initiator device drops the current-received data packet and switches from a receiver function into a transmitter function.

In step 340, after the transmitter of the SR initiator device is active (while the receiver of the SR initiator device becomes into idle), the transmitter of the SR initiator device transmits a short dummy leading signal to a SR response device. For example but not limited by, the short dummy leading signal may be all 1's or all 0's and have a duration of 24 μs. The SR response device drops the current-receiving data packet and switches to decode the short dummy leading signal which is a strong signal.

In step 350, the transmitter of the SR initiator device waiting for a short period. That is, the transmitter of the SR initiator device becomes into idle for a short period, for example but not limited by, 16 μs.

In step 360, the transmitter of the SR initiator device transmits spatial reuse data packet (for example but not limited by, having ~2 ms long period) to the SR response device.

Figure 4:
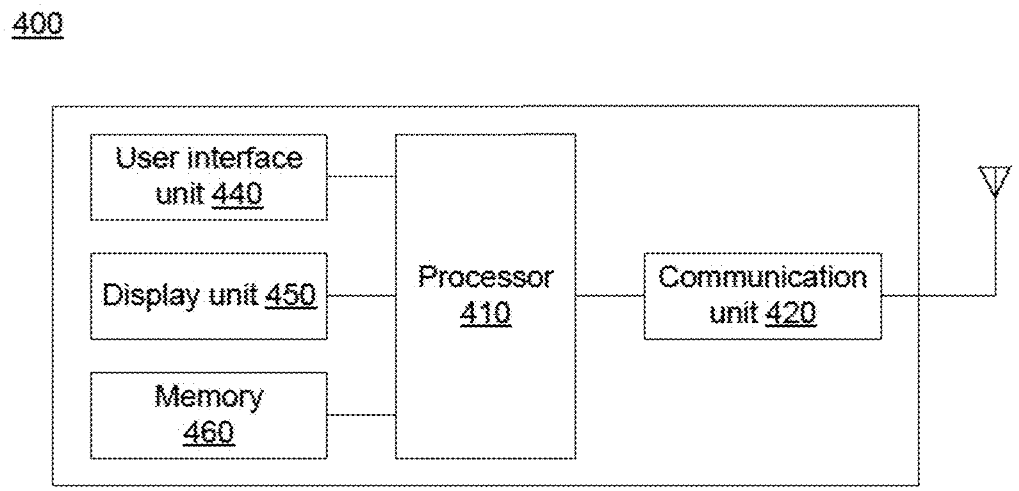
FIG. 4 is a block diagram illustrating a configuration of a station according to an embodiment of the present invention.

FIG. 4 is a block diagram illustrating a configuration of a station 400 according to an embodiment of the present invention. As illustrated in FIG. 4, the station 400 according to the embodiment of the present invention may include a processor 410, a communication unit 420, a user interface unit 440, a display unit 450, and a memory 460. The station 400 may be used to implement either the SR initiator device or the SR response device. The processor 410 is coupled to the communication unit 420, the user interface unit 440, the display unit 450, and the memory 460.

First, the communication unit 420 transmits and receives a wireless signal such as a wireless LAN packet, or the like and may be embedded in the station 400 or provided as an exterior. According to the embodiment, the communication unit 420 may include at least one communication module using different frequency bands. For example, the communication unit 420 may include communication modules having different frequency bands such as 2.4 GHz, 5 GHZ, and 60 GHz. According to an embodiment, the station 400 may include a communication module using a frequency band of 6 GHz or more and a communication module using a frequency band of 6 GHz or less. The respective communication modules may perform wireless communication with the AP or an external station according to a wireless LAN standard of a frequency band supported by the corresponding communication module. The communication unit 420 may operate only one communication module at a time or simultaneously operate multiple communication modules together according to the performance and requirements of the station 400. When the station 400 includes a plurality of communication modules, each communication module may be implemented by independent elements or a plurality of modules may be integrated into one chip. In an embodiment of the present invention, the communication unit 420 may represent a radio frequency (RF) communication module for processing an RF signal.

Next, the user interface unit 440 includes various types of input/output means provided in the station 400. That is, the user interface unit 440 may receive a user input by using various input means and the processor 410 may control the station 400 based on the received user input. Further, the user interface unit 440 may perform output based on a command of the processor 410 by using various output means.

Next, the display unit 450 outputs an image on a display screen. The display unit 450 may output various display objects such as contents executed by the processor 410 or a user interface based on a control command of the processor 410, and the like.

Further, the memory 460 stores a control program used in the station 400 and various resulting data. The control program may include an access program required for the station 400 to access the AP or the external station.

The processor 410 may execute various commands or programs and process data in the station 400. Further, the processor 410 may control the respective units of the station 400 and control data transmission/reception among the units. According to the embodiment of the present invention, the processor 410 may execute the program for accessing the AP stored in the memory 460 and receive a communication configuration message transmitted by the AP. Further, the processor 410 may read information on a priority condition of the station 400 included in the communication configuration message and request the access to the AP based on the information on the priority condition of the station 400. The processor 410 may represent a main control unit of the station 400 and according to the embodiment. The processor 410 may represent a control unit for individually controlling some component of the station 400, for example, the communication unit 420, and the like. That is, the processor 410 may be a modem or a modulator/demodulator for modulating and demodulating wireless signals transmitted to and received from the communication unit 420. The processor 410 controls various operations of wireless signal transmission/reception of the station 400 according to the embodiment of the present invention. The processor 410 may implement the receiver function and the transmitter function of the SR initiator device of one embodiment of the application. The processor 410 includes a plurality of hardware circuit.

The station 400 illustrated in FIG. 4 is a block diagram according to an embodiment of the present invention, where separate blocks are illustrated as logically distinguished elements of the device. Accordingly, the elements of the device may be mounted in a single chip or multiple chips depending on design of the device. For example, the processor 410 and the communication unit 420 may be implemented while being integrated into a single chip or implemented as a separate chip. Further, in the embodiment of the present invention, some components of the station 400, for example, the user interface unit 440 and the display unit 450 may be optionally provided in the station 400.

Figure 5:
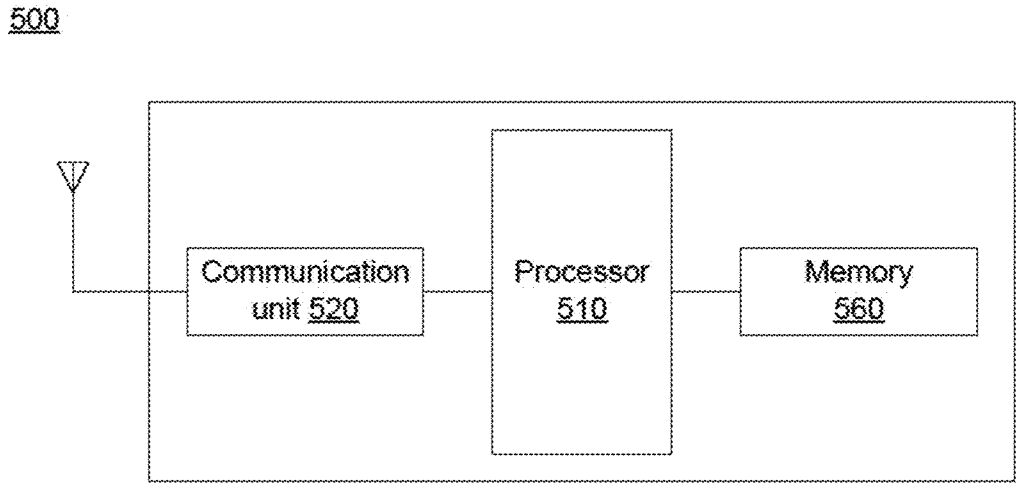
FIG. 5 is a block diagram illustrating a configuration of an AP according to an embodiment of the present invention.

FIG. 5 is a block diagram illustrating a configuration of an AP 500 according to an embodiment of the present invention. As illustrated in FIG. 5, the AP 500 according to the embodiment of the present invention may include a processor 510, a communication unit 520, and a memory 560. In FIG. 5, among the components of the AP 500, duplicative description of parts which are the same as or correspond to the components of the station 400 of FIG. 4 will be omitted. Also, the AP 500 may be used implement the SR initiator device or the SR response device of one embodiment of the application. The processor 510 is coupled to the communication unit 520, and the memory 560.

Referring to FIG. 5, the AP 500 includes the communication unit 520 for operating the BSS in at least one frequency band. As described in the embodiment of FIG. 5, the communication unit 520 of the AP 500 may also include a plurality of communication modules using different frequency bands. That is, the AP 500 according to the embodiment of the present invention may include two or more communication modules among different frequency bands, for example, 2.4 GHZ, 5 GHZ, and 60 GHz together. Preferably, the AP 500 may include a communication module using a frequency band of 6 GHz or more and a communication module using a frequency band of 6 GHz or less. The respective communication modules may perform wireless communication with the station according to a wireless LAN standard of a frequency band supported by the corresponding communication module. The communication unit 520 may operate only one communication module at a time or simultaneously operate multiple communication modules together according to the performance and requirements of the AP 500. In an embodiment of the present invention, the communication unit 520 may represent a radio frequency (RF) communication module for processing an RF signal.

Next, the memory 560 stores a control program used in the AP 500 and various resulting data. The control program may include an access program for managing the access of the station. Further, the processor 510 includes a plurality of hardware circuit. The processor 510 may control the respective units of the AP 500 and control data transmission/reception among the units. According to the embodiment of the present invention, the processor 510 may execute the program for accessing the station stored in the memory 560 and transmit communication configuration messages for one or more stations. In this case, the communication configuration messages may include information about access priority conditions of the respective stations.

Further, the processor 510 performs an access configuration according to an access request of the station. According to an embodiment, the processor 510 may be a modem or a modulator/demodulator for modulating and demodulating wireless signals transmitted to and received from the communication unit 520. The processor 510 controls various operations such as wireless signal transmission/reception of the AP 500 according to the embodiment of the present invention. The processor 510 may implement the receiver function and the transmitter function of the SR initiator device of one embodiment of the application.

In prior spatial reuse, prior solution needs to reduce modulation rate or data rate in transmitting spatial reuse packet when synchronization is not well, which degrades communication of spatial reuse. Also, prior solution may sometimes suffer from decoding failure of PHY header.

In one embodiment of the application, before sending spatial reuse data packet, a short dummy leading signal is sent from the SR initiator device to the SR response device to make the receiver of the SR response device return to idle state. Therefore, when the receiver of the SR response device receives the spatial reuse data packet, the receiver of the SR response device does not have to drop packet, the synchronization between the SR response device and the SR initiator device is well, and thus it is easier to have good decoding. Thus, in one embodiment of the application, the SR response device and the SR initiator device do not have to reduce modulation rate or data rate in transmitting spatial reuse data packets.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method including:
decoding a heading information of a current-received data packet by a spatial reuse (SR) initiator device;
based on a decoding result, determining to initiate SR by the SR initiator device;
dropping the current-received data packet by the SR initiator device;
transmitting a dummy leading signal by the SR initiator device to a SR response device, wherein the dummy leading signal is configured to cause the SR response device to return to an idle state, thereby synchronizing between the SR response device and the SR initiator device; and
transmitting a spatial reuse data packet from the SR initiator device to the SR response device.

2. The wireless communication method according to claim 1, wherein when the SR initiator device determines that the current-received data packet is a part of an OBSS, the SR initiator device decides to initiate SR.

3. The wireless communication method according to claim 1, wherein the dummy leading signal includes either all 1's or all 0's.

4. The wireless communication method according to claim 1, wherein the dummy leading signal has a duration of 24 μs.

5. The wireless communication method according to claim 1, wherein
when receiving and decoding the dummy leading signal from the SR initiator device by the SR response device, the SR response device drops a second data packet and switches to decode the dummy leading signal; and
upon reception of the spatial reuse data packet by the receiver of the SR response device, the receiver of the SR response device is synchronized with the SR initiator device.

6. The wireless communication method according to claim 1, wherein
after transmitting the dummy leading signal from the SR initiator device to the SR response device, a transmitter of the SR initiator device becomes into idle for a reference idle period.

7. The wireless communication method according to claim 6, wherein the reference idle period is 16 μs.

8. The wireless communication method according to claim 6, wherein after the reference idle period, the SR initiator device transmits the spatial reuse data packet to the SR response device.

9. The wireless communication method according to claim 1, wherein the spatial reuse data packet has a 2 ms period.

10. A wireless communication device including:
a communication unit; and
a processor coupled to the communication unit, wherein the processor is configured for:
decoding a heading information of a current-received data packet;
based on a decoding result, determining to initiate spatial reuse (SR);
dropping the current-received data packet;
transmitting a dummy leading signal to a SR response device, wherein the dummy leading signal is configured to cause the SR response device to return to an idle state, thereby synchronizing between the SR response device and the SR initiator device; and
transmitting a spatial reuse data packet to the SR response device.

11. The wireless communication device according to claim 10, wherein when the processor determines that the current-received data packet is a part of an OBSS, the processor decides to initiate SR.

12. The wireless communication device according to claim 10, wherein the dummy leading signal includes either all 1's or all 0's.

13. The wireless communication device according to claim 10, wherein the dummy leading signal has a duration of 24 μs.

14. The wireless communication device according to claim 10, wherein when receiving and decoding the dummy leading signal, the SR response device drops a second data packet and switches to decode the dummy leading signal; and
upon reception of the spatial reuse data packet by the receiver of the SR response device, the receiver of the SR response device is synchronized with the SR initiator device.

15. The wireless communication device according to claim 10, wherein
after transmitting the dummy leading signal to the SR response device, a transmitter of the wireless communication device becomes into idle for a reference idle period.

16. The wireless communication device according to claim 15, wherein the reference idle period is 16 μs.

17. The wireless communication device according to claim 15, wherein after the reference idle period, the wireless communication device transmits the spatial reuse data packet to the SR response device.

18. The wireless communication device according to claim 10, wherein the spatial reuse data packet has a 2 ms period.

* * * * *